United States Patent
Fellows et al.

[11] 4,019,806
[45] Apr. 26, 1977

[54] ECCENTRIC OPTICAL FIBER COUPLER

[75] Inventors: Daniel Fellows, Framingham; Stanley Zemon, Boston; Phillip A. Sturk, Haverhill; Samuel M. Stone, Lynnfield, all of Mass.

[73] Assignee: GTE Laboratories Incorporated, Waltham, Mass.

[22] Filed: Sept. 4, 1975

[21] Appl. No.: 610,505

[52] U.S. Cl. .............................. 350/96 C
[51] Int. Cl.² ............................ G02B 5/14
[58] Field of Search ............ 350/96 C, 96 B, 96 R; 339/272

[56] References Cited
UNITED STATES PATENTS

| | | | |
|---|---|---|---|
| 3,800,388 | 4/1974 | Börner et al. | 350/96 C X |
| 3,885,859 | 5/1975 | Dalgleish | 350/96 C |
| 3,914,880 | 10/1975 | Dakass et al. | 350/96 C |
| 3,936,143 | 2/1976 | Sato | 350/96 C |

OTHER PUBLICATIONS

Börner et al, "Losbare Steckverbindung fur Ein-Model-Glas-faserlichtwellenleiter", Areh. Electron. Ubertragungstech., vol. 26, No. 6, June 1972, pp. 288–289.

*Primary Examiner*—John K. Corbin
*Assistant Examiner*—Rolf Hille
*Attorney, Agent, or Firm*—Irving M. Kriegsman; Leslie J. Hart; Robert A. Seldon

[57] ABSTRACT

An improved optical fiber coupler for use with eccentrically mounted optical fibers is disclosed in which a V-groove coupler block is utilized for receiving and locating the mating pair of connectors. The connectors are circularly cylindrical and each lies in an end of a V-groove recess. The V-groove at one end of the coupler block is offset relative to the V-groove at the other end by the incorporation of a thin shim on one of the faces of the V-groove. The thickness of the shim determines the amount of offset.

3 Claims, 3 Drawing Figures

ECCENTRIC OPTICAL FIBER COUPLER

BACKGROUND OF THE INVENTION

This invention relates generally to couplers for optical fibers and is more particularly concerned with optical fiber couplers for eccentrically mounted optical fibers which are simple in construction and which are highly efficient in normal operating environments.

A recent development in communication systems involves the use of the optical fibers for very high bandwidth communication channels. The use of such optical fibers, which carry light energy distributed over an area, has led to the need for a coupler which can conveniently and efficiently couple a pair of such optical fibers to each other. The difficulty in accomplishing this end is directly attributable to the cross-sectional dimensions of the optical fibers. The dimension for the light carrying portion of such optical fibers commonly is on the order of about 50 micrometers.

The coupling of optical fibers involves generally precise mechanical control of the alignment of the optical fibers to achieve low coupling losses. Furthermore, for such optical communication systems to be of general utility, the couplers associated therewtih must be such as to be adaptable to use in the field. Therefore, the couplers must be rugged, yet simple in construction so as to provide physical protection for the actual optical fibers, yet allow for quick and convenient operation of the coupling function.

Various fiber-to-fiber coupling techniques are found in the prior art. Principally, these techniques may be divided into those which utilize connectors having the optical fibers precisely centered therein, such as shown and described in copending patent application Ser. No. 498,803, filed August 19, 1974, by Bridger et al. now issued as U.S. Pat. No. 3,914,880 and entitled Optical Fiber Coupler and Connector, this application being assigned to the same assignee as the instant application, and connectors wherein the optical fiber is eccentrically located, such as shown in United States Pat. No. 3,800,388 by Börner et al. Both of these arrangements have certain advantages associated therewith. The concentric coupler may be snapped together in the field without need for checking for the alignment of the fiber by passage of a signal through the coupling junction. However, the efficiency of this coupling depends upon the accuracy with which the minute optical fiber is centered in the connector. Highly precise centering, of course, greatly increases the expense of the couplers. On the other hand, the eccentrically mounted optical fiber connectors require adjustment in order to effect precise alignment of the optical fibers. However, far less care is required in the assembly of the couplers to the fibers since adjustment of the relative positions is inherent within the arrangement.

The eccentrically mounted coupler configuration has suffered from another disadvantage in all prior art configurations in that because the connectors must be rotated within the coupling arrangement, distortion and scoring occur and the ability to precisely align and hold that alignment is destroyed easily.

SUMMARY OF THE INVENTION

It is, therefore, an object of the present invention to provide a novel eccentrically mounted optical fiber coupler which is simple, inexpensive to construct and less susceptible to degradation through rotational wear.

Accordingly, the invention in its broadest aspect comprises an optical fiber coupler in which a pair of circularly cylindrical optical fiber connectors are mounted. Each of the connectors has an optical fiber located at one end of the connector at a respective first distance from the axis thereof. The coupler also includes a coupler block having a V-groove channel therethrough to receive and locate the pair of connectors with their one ends in a juxtaposed, opposed relationship. One surface of the V-groove channel is planar and continuous over the length of the V-groove. The other surface of the V-groove is divided laterally into two parallel planar segments. The planes of the segments are separated by a second distance which is less than the sum of the respective first distances and greater than the difference between the respective first distances. The second distance serves to offset the two optical fiber connectors. Means are provided for firmly seating and retaining the optical fiber connectors in the channel to enable efficient optical coupling between the optical fibers.

Further objects, advantages, and features of the invention will be apparent in the arrangement and construction of the constituent parts, in detail, as set forth in the following specification taken together with the accompanying drawing.

DETAILED DESCRIPTION OF THE PREFERRED EMBODIMENT

Figure 1:
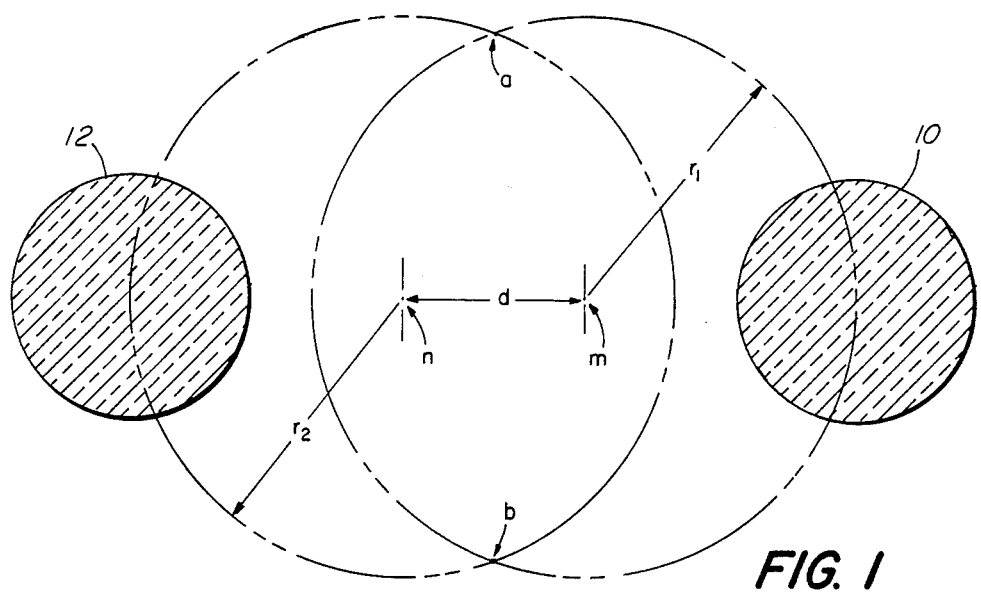
FIG. 1 is a greatly enlarged schematic representation of the relative movement capabilities of a pair of mating eccentrically mounted optical fibers which is useful in understanding the principles of the invention.

In referring to the various figures of the drawing hereinbelow, like reference numerals will be utilized to refer to identical parts of the apparatus.

Referring initially to FIG. 1, there is shown a greatly enlarged schematic representation of a pair of optical fibers 10 and 12 which may be precisely coupled together utilizing the apparatus of the present invention. The optical fibers 10 and 12 are eccentrically mounted in a pair of optical fiber connectors which are not shown in this figure. The optical fiber connectors are circularly cylindrical and have axes of rotation denoted in this figure by $n$ and $m$. The axes of rotation $n$ and $m$ are parallel to each other and are separated by a predetermined distance $d$. The distance $d$ is less than the sum of the first distances $r_2$ and $r_1$ respectively from the centers of rotation $n$ and $m$ to the centers of the optical fibers 10 and 12 and greater than the difference between $r_1$ and $r_2$. Therefore, when the optical fiber connectors in which the optical fibers 10 and 12 are mounted and rotated about their rotational axes, the centers of the optical fibers 10 and 12 trace out a pair of circles. The circles intersect at two positions denoted by the letters $a$ and $b$. When both of the optical fibers 10 and 12 are rotated to either position $a$ or position $b$, precise alignment therebetween may be accomplished.

Figure 2:
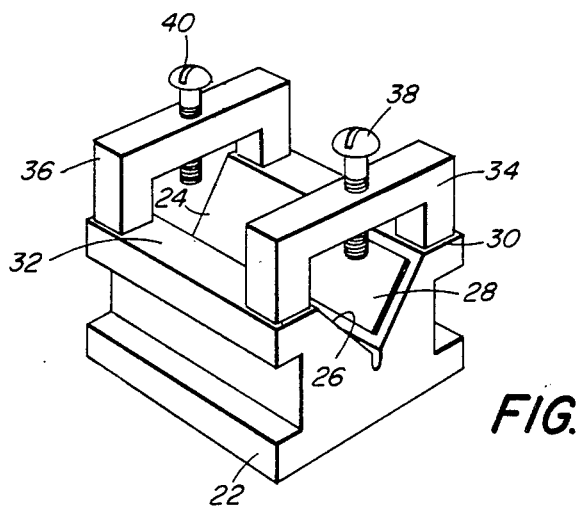
FIG. 2 is a perspective view of a coupler block having a V-groove according to the present invention therethrough.

Referring now to FIG. 2 of the drawing, a coupler block 22 according to the present invention is shown for eccentrically mounting the pairs of optical fibers. The coupler block 22 has a V-groove across its length. The V-groove is formed on one side by a continous planar surface 26 over its entire length. On the other side, a pair of similar parallel planar segments 24 and 28 divide the V-groove at approximately midlength. One of the segments, in this case 28, is offset from the other segment 24. Preferably, the faces of the V-groove are perpendicular to each other as in FIG. 2; however, the principle of the present invention is equally applicable to V-grooves having other than a right angle. When the faces are perpendiclar, the distance by which the two segments 24 and 28 are offset is equal to the second distance $d$ as shown in FIG. 1.

The V-block can be formed as described in a single solid piece; however, in the preferred forms of the invention, the offset is controllably accomplished by the introduction of a thin shim of plate material along one end of one of the faces of the V-groove channel. The segment 28 is thus offset from the segment 24 by the thickness of the shim. By utilizing a shim rather than a machined V-block, it is possible to accommodate particular combinations of optical fibers whose distances of eccentricity are different. So long as the amount of eccentricity is known, an appropriate shim may be introduced into the V-groove which allows precise alignment between the mating eccentrically mounted optical fibers.

In addition, means are included in the apparatus for firmly seating and retaining the optical fiber connectors in the V-groove channel in order to accomplish efficient coupling between the optical fibers. In the embodiment shown in FIG. 2 of the drawing, this is accomplished by a pair of C-shaped straps 34 and 36 which are attached to the upper surfaces 30 and 32 of the coupler block so as to straddle the V-groove. The straps 34 and 36 respectively carry holding members 38 and 40 which are preferably screws which include a spring-biased ball tipped element for exerting a force on each of the connectors which is perpendicular to the rotational axis of the connector.

Figure 3:
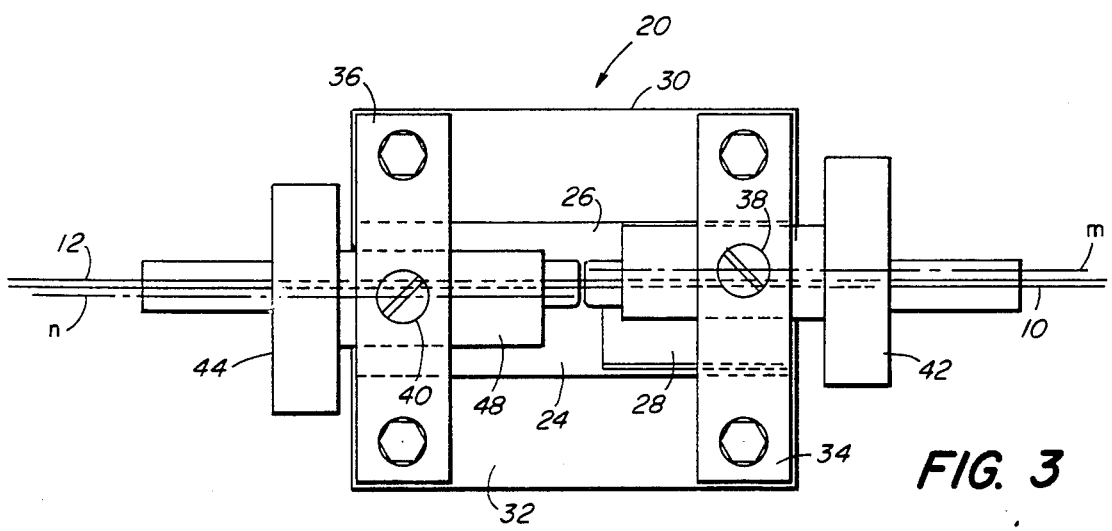
FIG. 3 is a plan view of an optical fiber coupler according to the present invention having a pair of circularly cylindrically optically fiber connectors mounted therein.

FIG. 3 shows the embodiment shown in FIG. 2 in plan view; however, a pair of optical fiber connectors 42 and 44 are mounted therein. As can be seen, the rotational center lines $m$ and $n$ are displaced from each other so that the optical fibers 10 and 12, respectively may be rotated into optical alignment.

This invention has advantages over the prior art devices in that it is not subject to the degradation through continual use that the prior art devices suffered from. To readjust or replace one or more of the optical fibers, the holding elements 38 and 40 are loosened and the device either replaced or rotated in order to achieve precise alignment without particular mating forces between the connector and the side of the V-groove. After precise alignment is achieved, the holding members may be once again torqued into position so that the connectors 42 and 44 are firmly held in position within the V-groove coupler block 22.

While there has been shown and described what is considered to be a preferred embodiment of the present invention, it will be obvious to those of ordinary skill in the art that various changes and modifications may be made therein without departing from the invention as defined in the appended claims.

We claim:

1. An optical fiber coupler comprising
   a pair of circularly cylindrical optical fiber connectors each having an end of an optical fiber located at one end of the connector at a respective first distance from the axis thereof,
   a coupler block having a V-groove channel therethrough to receive and locate the pair of connectors with their one ends in a juxtaposed, opposed relationship, one surface of the V-groove channel being planar and continous over the length of the V-groove, the other surface of the V-groove being divided laterally into two parallel planar segments, the planes of the segments being separated by a second distance which is greater than the difference between the respective first distances, and less than the sum of the respective first distances, and
   means for firmly seating and retaining each fiber optic connector in the channel and against a respective segment to enable efficient optical coupling between the optical fibers.

2. An optical fiber coupler according to Claim 1, wherein one of the planar segments is a shim whose thickness is the second distance emplaced on the other one of the planar segments.

3. An optical fiber coupler according to Claim 2, wherein the means for firmly seating and retaining the optical fiber connectors in the V-groove channel includes an individual spring-biased element exerting a force on each of the connectors which is perpendicular to the axis of the connectors.

* * * * *